United States Patent Office 3,323,925
Patented June 6, 1967

3,323,925
WAX POLISH COMPOSITIONS
George Kesslin, Teaneck, N.J., and Robert Wesley Handy, Stony Point, and James Richard Steinmetz, Congers, N.Y., assignors to Kay-Fries Chemicals, Inc., West Haverstraw, N.Y., a corporation of New York
No Drawing. Filed Apr. 8, 1964, Ser. No. 358,403
6 Claims. (Cl. 106—10)

This invention relates to novel wax polish compositions and more particularly to compositions which comprise dispersions of wax, and a higher aliphatic ortho formate which have improved gelling properties, and improved removability, and improved slip resistance.

Liquid wax polishes are widely used on wood, linoleum, tile and metal surfaces to improve the appearance of the surface and to protect the surface from dirt. One common problem with many freshly polished floor surfaces, especially surfaces polished with a hard wax polish, is that the surface is dangerously slippery. Another common problem with the waxed surfaces is the difficulty encountered in removing an old thick wax layer prior to the application of a new wax coating. It is well known that if an old thick layer of wax is not properly removed from a surface it will mar the appearance of the superimposed wax coating.

Many efforts have been made to correct the lack of slip resistance of floor waxes, by including other materials such as silica, ground feldspar, clay, in the wax mixture. Such compositions do not effect the removability of the wax coating, nor do they improve the dispersibility of the wax or the gelling properties of wax pastes.

It is an important object of this invention to produce a wax polish composition having improved slip-resistance.

It is another important object of this invention to produce a wax polish composition that is easier to wash off a surface.

It is another important object of this invention to produce an improved gelling agent for paste wax polish compositions.

Other objects and features of the invention will become apparent from the more detailed description that follows and the most novel features will be particularly pointed out in the appended claims.

Now, according to the present invention, it has been found that by including a $C_{16}$ to $C_{20}$ aliphatic ortho formate in wax dispersion compositions are produced that have improved slip-resistance, improved removability, improved spreading ease, and improved gelling characteristics in solvent paste waxes.

The invention is illustrated, but not limited, by the following specific examples. It will be clear that various additional modifications can be made without deviating from the scope of the invention.

The term $C_{16}$ to $C_{20}$ aliphatic ortho formate as used in describing this invention refers to the ortho formates containing aliphatic groups containing 16 to 20 carbon atoms.

These ortho formate compounds may be produced by reacting ethyl ortho formate with an aliphatic alcohol containing 16 to 20 carbon atoms in the absence of both a catalyst and a solvent. The reaction mixture is heated to refluxing and ethyl alcohol is distilled off at normal pressure until no more comes off. Then a vacuum is applied and any remaining alcohol is removed until no more comes off. The residue is then carbon treated and filtered free of carbon. In this way, for instance, substantially all of the ethyl alcohol groups could be replaced by octadecanol groups to form so-called stearyl ortho formate i.e., trioctadecyloxymethane. The higher aliphatic ortho formates so produced are solid white wax-like products at room temperature. These ortho formates can be mixed easily into conventional wax polish compositions using standard wax mixing procedures.

A preferred wax composition is a paste mixture containing, as is usual, a number of waxes such as paraffin wax, carnauba wax, castor wax, polyethylene wax, microcrystalline wax, along with naphta, and, as a partial replacement, stearyl ortho formate. The relative amount of solid wax to solvent may vary widely. Usually a good past wax contains 20 to 40 percent wax, and the stearyl ortho formate typically would make up 3% of this wax portion.

The relative amount of higher aliphatic ortho formate used in the compositions of this invention may be widely varied, and the amount used would be determined by the specific use desired. The preferred amount of these ortho formates is ½ to 10 percent by weight of the wax material present in the mixture. Greater amounts may be used. The greater the amount of these ortho formates used, the greater the gelling effect; the softer the wax coating; and the greater the ease of removability of the wax mixture. For example, if one wished to use a wax having greater solvent retention one would increase the amount of these higher molecular weight ortho formates in his wax mixture. Also, the greater the proportions of the ortho formates hereof mixed into the wax compositions, the faster and easier the wax mixture will wash off with ordinary soap and water.

The $C_{16}$ to $C_{20}$ aliphatic ortho formates; as stated above, function as gelling agents, anti slip agents, and facilitate spreading of the wax polish. In addition to these functions these ortho formates also act as emulsifying agents alone or in combination with other emulsifying agents.

The term "wax" as used herein, and in the claims, includes the normally used polish waxes, singly or in combination, such as naturally occurring fatty acid esters such as carnauba, candelilla, beeswax, etc., and other organic materials which have the physical character of waxes, such as polyethylenes, paraffins, ozokerites, etc. Such materials are well known in the art.

The wax polish dispersions disclosed herein may be dispersed in commonly used dispersion media including solvents or solvent mixtures, such as, water, alcohols, ethers, etc. These media are referred to herein and in the claims as the dispersing medium.

A wide variety of emulsifying agents may be added to the compositions of this invention such as morpholine, mineral sulphonate, ammonia, amines, fatty acids such as oleic, palmitic, stearic, etc., potash or soda soaps, borax, non-ionic emulsifying agents such as glycerol esters of higher fatty acids, etc. Such emulsifying agents are also well known in the wax polish art.

A typical example illustrating the effects of the addition of stearyl ortho formate to a paste wax is shown by the following comparison where composition A is polyethylene wax containing:

*Composition A*

| Component | Parts by weight |
|---|---|
| Polyethylene | 3.4 |
| Carnauba wax (No. 2 yellow) | 3.0 |
| Castor wax | 2.0 |
| Micro crystalline wax | 2.0 |
| Naphtha | 2.5 |
| Uncompressed silica | 1.0 |
| Water | 9.5 |

Composition B was the same as composition A except that 3% by weight of the polyethylene was replaced by an equal weight of stearyl ortho formate.

Comparing compositions A and B we found that composition B had a better buffed gloss than A, B was a little easier to spread than A, neither A nor B bled, B was more slip-resistant than A, B was slightly easier to wash off a surface than A, and A had a slightly better buffability than B.

Similar results are obtained when $C_{16}$, $C_{17}$, $C_{19}$, and $C_{20}$ aliphatic ortho formates are substituted for stearyl ortho formate. Once again the degree of modification of the wax polish is determined by the amount of ortho formate added to the polish.

What is claimed is:

1. A wax polish composition comprising wax, a dispersing medium, and a $C_{16}$ to $C_{20}$ aliphatic hydrocarbon ortho formate.
2. The composition of claim 1, wherein the wax comprises 20 to 40 percent by weight of the mixture.
3. The composition of claim 1, wherein the ortho formate comprises ½ to 10 percent by weight, based upon the weight of the wax.
4. The combination of claim 2, wherein the ortho formate comprises ½ to 10 percent by weight, based upon the weight of wax.
5. A wax emulsion polishing composition comprising an aqueous wax emulsion and a $C_{16}$ to $C_{20}$ aliphatic ortho formate.
6. The composition of claim 3, wherein the ortho formate is stearyl.

References Cited
FOREIGN PATENTS 425,396  4/1934  Great Britain.

OTHER REFERENCES

Chem. & Eng. News, Nov. 22, 1965 (p. 98); Aug. 30, 1965 (p. 86).

ALEXANDER H. BRODMERKEL, *Primary Examiner.*

MORRIS LIEBMAN, *Examiner.*

T. MORRIS, *Assistant Examiner.*